US008214205B2

(12) United States Patent
Jang et al.

(10) Patent No.: US 8,214,205 B2

(45) Date of Patent: Jul. 3, 2012

(54) SPEECH ENHANCEMENT APPARATUS AND METHOD

(75) Inventors: Giljin Jang, Suwon-si (KR); Jeongsu Kim, Yongin-si (KR); Kwangcheol Oh, Seongnam-si (KR); Sungcheol Kim, Goyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1149 days.

(21) Appl. No.: 11/346,273

(22) Filed: Feb. 3, 2006

(65) Prior Publication Data

US 2007/0185711 A1 Aug. 9, 2007

(30) Foreign Application Priority Data

Feb. 3, 2005 (KR) ........................ 10-2005-0010189

(51) Int. Cl.

| | |
|---|---|
| ***G10L 21/02*** | (2006.01) |
| ***G10L 19/14*** | (2006.01) |
| ***G10L 15/00*** | (2006.01) |
| ***G10L 15/20*** | (2006.01) |
| ***G10L 19/00*** | (2006.01) |

(52) U.S. Cl. ........ 704/226; 704/224; 704/231; 704/233; 704/219; 704/205

(58) Field of Classification Search .................. 704/226, 704/219, 205, 228, 233, 231, 224; 381/94.3; 370/289

See application file for complete search history.

(56) References Cited

U.S. PATENT DOCUMENTS

| | | | | |
|---|---|---|---|---|
| 5,742,924 | A * | 4/1998 | Nakayama | 701/458 |
| 5,742,927 | A * | 4/1998 | Crozier et al. | 704/226 |
| 5,752,226 | A * | 5/1998 | Chan et al. | 704/233 |
| 5,812,970 | A * | 9/1998 | Chan et al. | 704/226 |
| 5,943,429 | A * | 8/1999 | Handel | 381/94.2 |
| 6,289,309 | B1 * | 9/2001 | deVries | 704/233 |
| 6,757,395 | B1 * | 6/2004 | Fang et al. | 381/94.3 |
| 6,766,292 | B1 * | 7/2004 | Chandran et al. | 704/224 |
| 6,778,954 | B1 * | 8/2004 | Kim et al. | 704/226 |
| 7,054,808 | B2 * | 5/2006 | Yoshida | 704/226 |
| 7,158,932 | B1 * | 1/2007 | Furuta | 704/226 |
| 7,428,490 | B2 * | 9/2008 | Xu et al. | 704/226 |

(Continued)

FOREIGN PATENT DOCUMENTS

| | | |
|---|---|---|
| EP | 0505645 | 9/1992 |
| EP | 1416473 | 5/2004 |

OTHER PUBLICATIONS

A.F. Ruckstuhl, M.P. Jacobson, R.W. Field and J.A. Dodd, J. Quant. Spectrosc. Radiat. Transfer 68 (2001), pp. 179-193.*

(Continued)

*Primary Examiner* — Douglas Godbold
*Assistant Examiner* — Edgar Guerra-Erazo
(74) *Attorney, Agent, or Firm* — Staas & Halsey LLP

(57) ABSTRACT

A speech enhancement apparatus and method and a computer-readable recording medium having a program recorded thereon execute a speech enhancement method. The speech enhancement apparatus includes a spectrum subtraction unit generating a subtracted spectrum by subtracting an estimated noise spectrum from a received speech spectrum, a correction function modeling unit generating a correction function to minimize a noise spectrum using variation of a noise spectrum included in training data, and a spectrum correction unit generating a corrected spectrum by correcting the subtracted spectrum using the correction function.

39 Claims, 7 Drawing Sheets

U.S. PATENT DOCUMENTS

| | | | | |
|---|---|---|---|---|
| 2002/0128830 | A1 * | 9/2002 | Kanazawa et al. | 704/226 |
| 2002/0156623 | A1 * | 10/2002 | Yoshida | 704/226 |
| 2003/0078772 | A1 * | 4/2003 | Wu et al. | 704/226 |
| 2005/0071156 | A1 * | 3/2005 | Xu et al. | 704/226 |
| 2007/0073537 | A1 * | 3/2007 | Jang et al. | 704/233 |

OTHER PUBLICATIONS

A.F. Ruckstuhl, M.P. Jacobson, R.W. Field and J.A. Dodd, J.,"Baseline subtraction using robust local regression estimation" Quant. Spectrosc. Radiat. Transfer 68 (2001), pp. 179-193.*

Cui, X. and A. Alwan, 2005. Noise robust speech recognition using feature compensation based on polynomial regression of utterance SNR. IEEE Trans. Speech Audio Process, 13(6): 1161-1172.*

D. E. Tsoukalas, J. Mourjopoulos, and G. Kokkinakis, "Speech enhancement based on audible noise suppression," IEEE Trans. Speech Audio Processing, vol. 5, pp. 497-514, Nov. 1997.*

Lassen and Medley, 2001 Lassen, H., Medley, P., 2001. Virtual Population Analysis. A practical manual for stock assessment. FAO Fish. Tech. Paper 400.*

Linhard, Klaus et al., "Spectral Noise Subtraction with Recursive Gain Curves," Daimler Benz AG, Research and Technology, Jan. 9, 1998, 4 pages.*

Elias Nemer, Rafik Goubran, and Samy Mahmoud, "SNR Estimation of Speech Signals Using Subbands and Fourth-Order Statistics", Jul. 1999 IEEE, pp. 171-174.*

XP-000955540—Factors Related to Spectral Subtraction for Speech in Noise Enhancement, Niederjohn et al., Marouette University, Dept. of Electrical Engineering and Computer Science, pp. 985-996 (Nov. 3, 1987) (In English).

European Patent Office Action for corresponding European patent application No. 06250606 dated May 16, 2006 (In English).

* cited by examiner

SPEECH ENHANCEMENT APPARATUS AND METHOD

CROSS-REFERENCE TO RELATED APPLICATIONS

This application claims the benefit of Korean Patent Application No. 10-2005-0010189, filed on Feb. 3, 2005, in the Korean Intellectual Property Office, the disclosure of which is incorporated herein in its entirety by reference.

BACKGROUND OF THE INVENTION

1. Field of the Invention

The present invention relates to a speech enhancement apparatus and method, and more particularly, to a speech enhancement apparatus and method for enhancing the quality and naturalness of speech by efficiently removing noise included in a speech signal received in a noisy environment and appropriately processing the peak and valley of a speech spectrum where the noise has been removed.

2. Description of the Related Art

In general, although speech recognition apparatuses exhibit high performance in a clean environment, the performance of speech recognition in an actual environment where the speech recognition apparatus is used, such as in a car, in a display space, or in a telephone booth, deteriorates due to surrounding noise. Thus, the deterioration in the performance of speech recognition by noise has worked as an obstacle to the wide spread of speech recognition technology. Accordingly, many studies have been developed to solve the problem. A spectrum subtraction method to remove additive noise included in a speech signal input to a speech recognition apparatus has been widely used to perform speech recognition which is robust with respect to the noisy environment.

The spectrum subtraction method estimates an average spectrum of noise in a speech absence section, that is, in a period of silence, and subtracts the estimated average spectrum of noise from an input speech spectrum by using a frequency characteristic of noise which changes relatively smoothly with respect to speech. When an error exists in the estimated average spectrum $|N_e(\omega)|$ of noise, a negative number may occur in a spectrum obtained by subtracting the estimated average spectrum $|N_e(\omega)|$ of noise from the speech spectrum $|Y(\omega)|$ input to the speech recognition apparatus.

To prevent the occurrence of a negative number in the subtracted spectrum, in a conventional method (hereinafter, referred to as the "HWR"), a portion 110 having an amplitude less than "0" in the subtracted spectrum ($|Y(\omega)|-|N_e(\omega)|$) is adjusted to uniformly have "0" or a very small positive value. In this case, although a noise removal performance is superior, a possibility that distortion of speech occurs during the process of adjusting the portion 110 to have "0" or a very small positive value is increased so that the quality of speech or the performance of recognitiondeteriorate.

In another conventional method (hereinafter, referred to as the "FWR"), in the subtracted spectrum ($|Y(\omega)|-|N_e(\omega)|$), a portion having an amplitude less than "0", for example, an amplitude value of P1, is adjusted to be the absolute value, that is, an amplitude value of P2, as shown in FIG. 2. In this case, although the quality of speech can be improved, more noise may be present. In FIGS. 1 and 2, $|S(\omega)|$ denotes the original speech signal in which no noise is mixed.

SUMMARY OF THE INVENTION

To solve the above and/or other problems, the present invention provides a speech enhancement apparatus and a method for enhancing the quality and natural characteristics of speech by efficiently removing noise included in a speech signal received in a noisy environment.

The present invention provides a speech enhancement apparatus and a method for enhancing the quality and natural characteristics of speech by efficiently removing noise included in a speech signal received in a noisy environment and appropriately processing the peak and valley of a speech spectrum where the noise has been removed.

The present invention provides a speech enhancement apparatus and method for enhancing the quality and natural characteristics of speech by appropriately processing the peak and valley existing in a speech spectrum received in a noisy existing environment.

According to an aspect of the present invention, there is provided a speech enhancement apparatus comprising: a spectrum subtraction unit generating a subtracted spectrum by subtracting an estimated noise spectrum from a received speech spectrum; a correction function modeling unit modeling a correction function to minimize a noise spectrum using variation of the noise spectrum included in a training data; and a spectrum correction unit generating a corrected spectrum by correcting the subtracted spectrum using the correction function.

According to another aspect of the present invention, a speech enhancement method includes: generating a subtracted spectrum by subtracting an estimated noise spectrum from a received speech spectrum; modeling a correction function to minimize the noise spectrum using variation of a noise spectrum included in a training data; and generating a corrected spectrum by correcting the subtracted spectrum using the correction function.

According to another aspect of the present invention, a speech enhancement apparatus includes: a spectrum subtraction unit generating a subtracted spectrum by subtracting an estimated noise spectrum from a received speech spectrum; a correction function modeling unit modeling a correction function to minimize a noise spectrum using variation of the noise spectrum included in training data; a spectrum correction unit generating a corrected spectrum by correcting the subtracted spectrum using the correction function; and a spectrum enhancement unit enhancing the corrected spectrum by emphasizing a peak and suppressing a valley which exist in the corrected spectrum.

According to another aspect of the present invention, a speech enhancement method includes: generating a subtracted spectrum by subtracting an estimated noise spectrum from a received speech spectrum; modeling a correction function to minimize the noise spectrum using variation of a noise spectrum included in training data; generating a corrected spectrum by correcting the subtracted spectrum using the correction function; and enhancing the corrected spectrum by emphasizing/enlarging a peak and suppressing a valley in the corrected spectrum.

According to another aspect of the present invention, a speech enhancement apparatus includes: a spectrum subtraction unit subtracting an estimated noise spectrum from a received speech spectrum, and generating a subtracted spectrum, in which a negative number portion is corrected; and a spectrum enhancement unit enhancing the corrected spectrum by emphasizing a peak and suppressing a valley in the subtracted spectrum.

According to another aspect of the present invention, a speech enhancement method includes: subtracting an estimated noise spectrum from a received speech spectrum and generating a subtracted spectrum where a negative number portion is corrected; and enhancing a corrected spectrum by emphasizing a peak and suppressing a valley in the subtracted spectrum.

Additional aspects and/or advantages of the invention will be set forth in part in the description which follows and, in part, will be apparent from the description, or may be learned by practice of the invention.

The patent or application file contains at least one drawing executed in color. Copies of this patent or patent application publication with color drawinq(s) will be provided by the U.S. Patent and Trademark Office upon request and payment of the necessary fee. The above and other features and advantages of the present invention will become more apparent by describing in detail embodiments thereof with reference to the attached drawings in which.

DETAILED DESCRIPTION OF THE PREFERRED EMBODIMENTS

Figure 1:
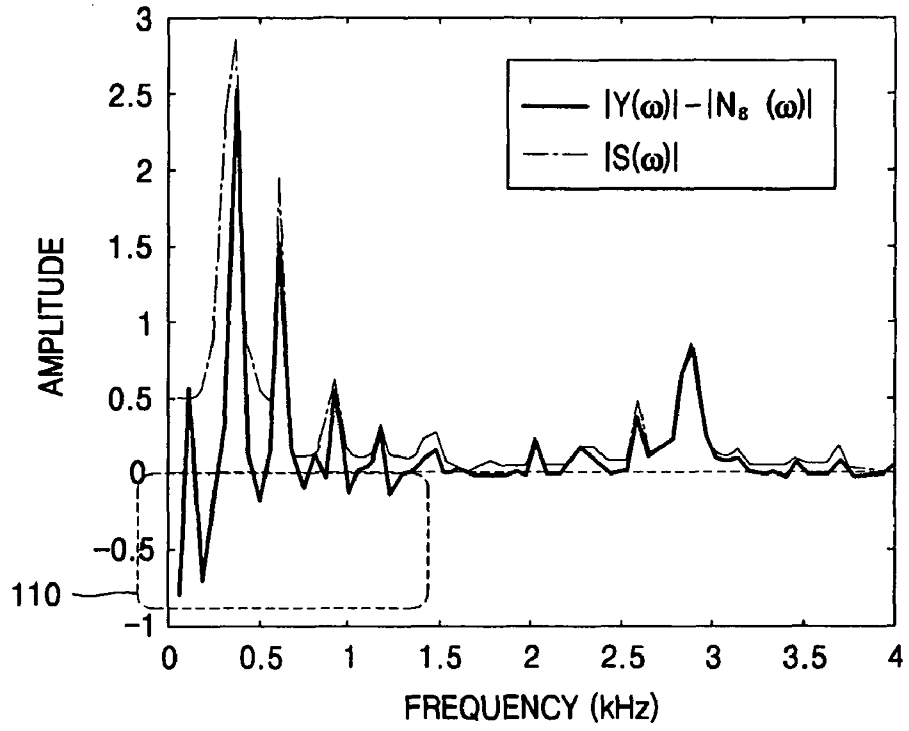
FIG. 1 (PRIOR ART)
FIG. 1 is a graph showing an example of a speech spectrum obtained by a conventional processing method for a case in which a negative number occurs in the speech spectrum generated by a spectrum subtraction method.
Figure 2:
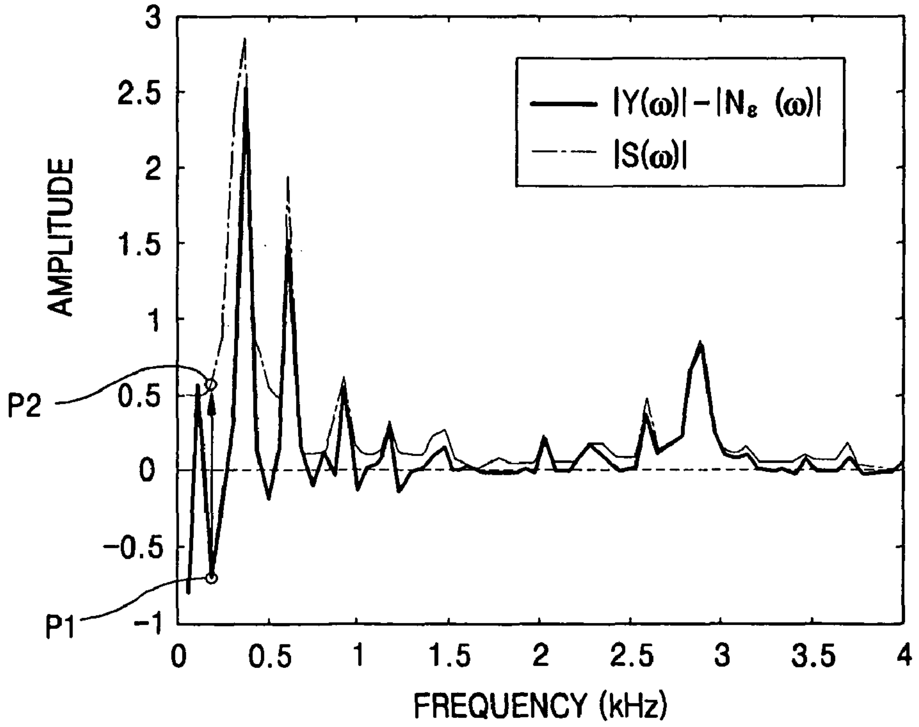
FIG. 2 (PRIOR ART)
FIG. 2 is a graph showing another example of a speech spectrum obtained by the conventional processing method for a case in which a negative number occurs in the speech spectrum generated by a spectrum subtraction method.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
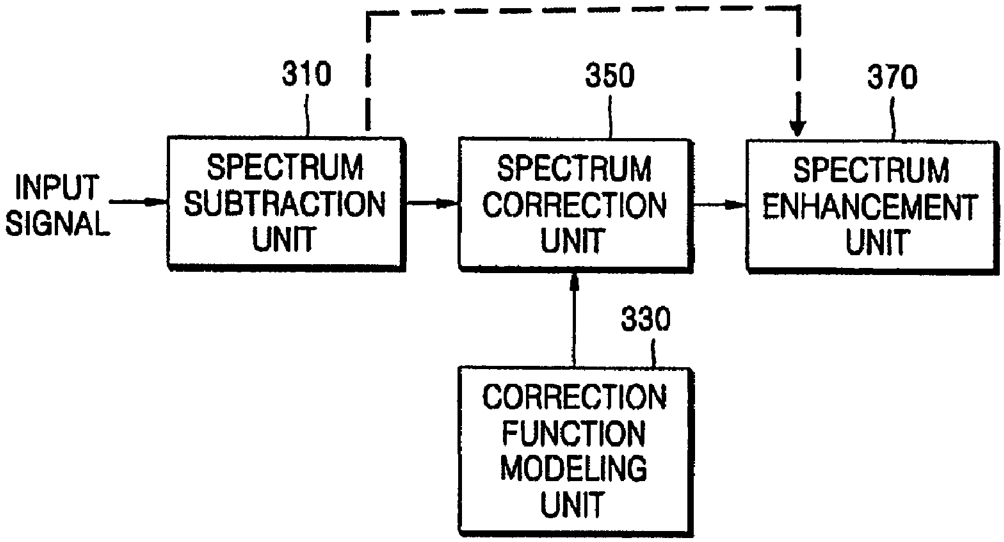
FIG. 3 is a block diagram illustrating a configuration of a speech enhancement apparatus according to an embodiment of the present invention.

Referring to FIG. 3, a speech enhancement apparatus according to a first embodiment of the present invention includes a spectrum subtraction unit 310, a correction function modeling unit 330, a spectrum correction unit 350, and a spectrum enhancement unit 370. According to a second embodiment of the present invention, a speech enhancement apparatus includes the spectrum subtraction unit 310, the correction function modeling unit 330, and the spectrum correction unit 350. According to a third embodiment of the present invention, a speech enhancement apparatus includes the spectrum subtraction unit 310 and the spectrum enhancement unit 370. In the third embodiment, the spectrum subtraction unit 310 corrects a negative number portion by substituting an absolute value of the negative number portion or "0" for the negative number portion and then provides a subtracted spectrum to the spectrum enhancement unit 370.

In FIG. 3, the spectrum subtraction unit 310 subtracts an estimated average spectrum of noise from a received speech spectrum and provides a subtracted spectrum to the spectrum correction unit 350. The correction function modeling unit 330 models a correction function that minimizes a noise spectrum using the variation of the noise spectrum included in training data and provides the correction function to the spectrum correction unit 350. The spectrum correction unit 350 corrects a portion having an amplitude value less than "0" in the subtracted spectrum provided from the spectrum subtraction unit 310 using the correction function, and then generates a corrected spectrum. The spectrum enhancement unit 370 emphasizes/enlarges a peak and suppresses a valley in the corrected spectrum provided from the spectrum correction unit 350 and outputs a finally enhanced spectrum.

Figure 4:
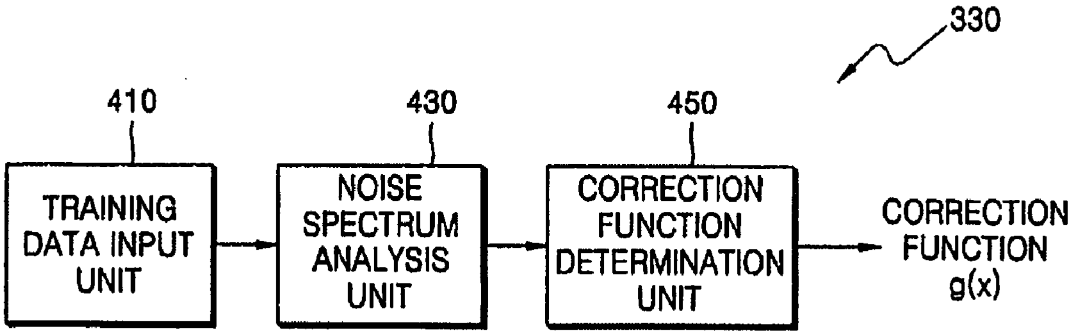
FIG. 4 is a block diagram illustrating a detailed configuration of the correction function modeling unit of FIG. 3.

FIG. 4 is a block diagram illustrating a detailed configuration of the correction function modeling unit 330 of FIG. 3. The correction function modeling unit 330 includes a training data input unit 410, a noise spectrum analysis unit 430, and a correction function determination unit 450.

Referring to FIG. 4, the training data input unit 410 inputs training data collected from a given environment. The noise spectrum analysis unit 430 compares a subtracted spectrum between the received speech spectrum and noise spectrum with respect to the training data with the original spectrum with respect to the training data and analyzes the noise spectrum included in the received speech spectrum. To minimize an estimated error of the noise spectrum for the subtracted spectrum, a portion having an amplitude value less than "0" in the subtracted spectrum is divided into a plurality of areas, and parameters for modeling a correction function for each area, for example, a boundary value of each area and a slope of the correction function, are obtained. The correction function determination unit 450 receives an input of the boundary value of each area and the slope of the correction function provided from the noise spectrum analysis unit 430 and produces a correction function for each area.

Figure 5:
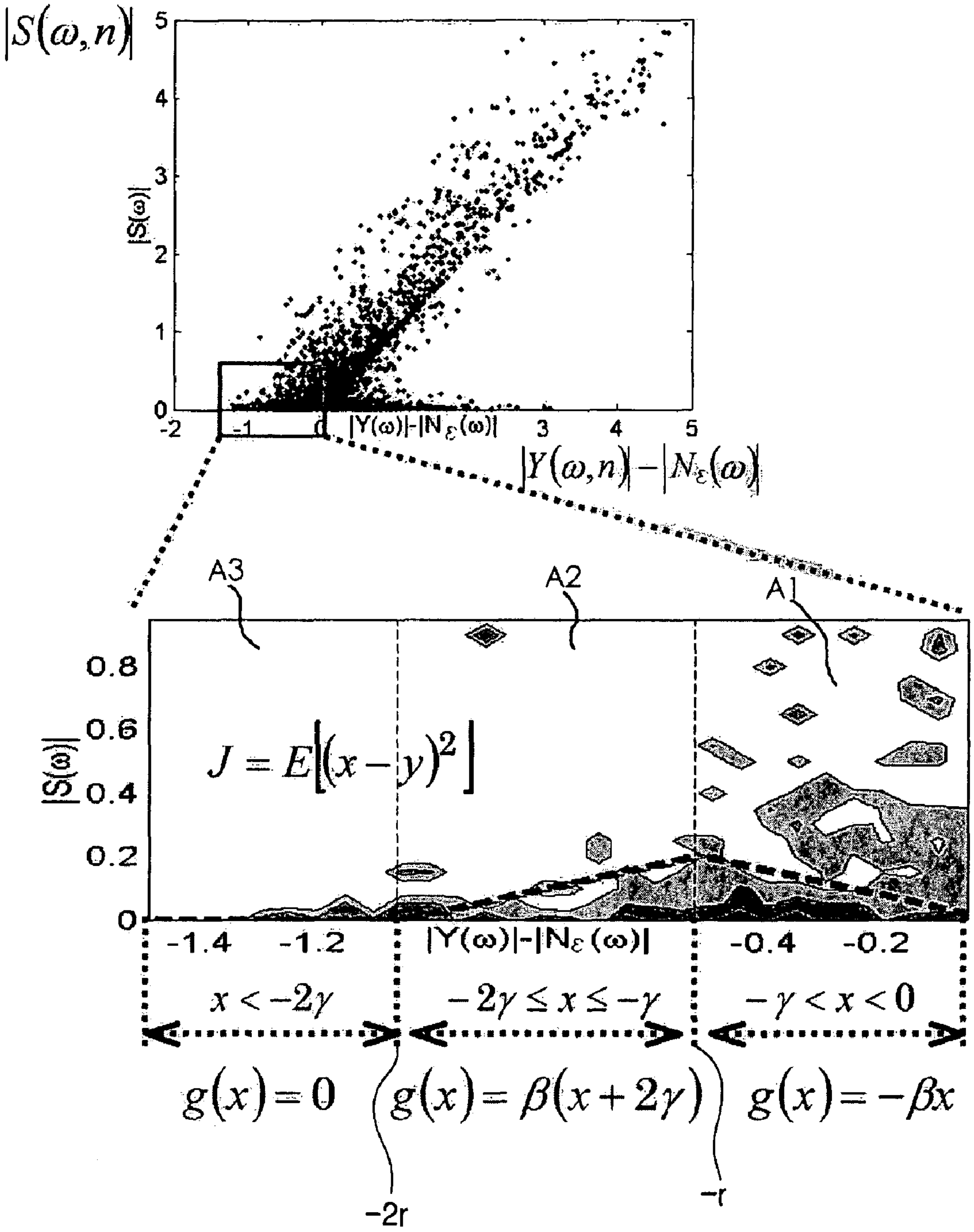
FIG. 5 is a view illustrating the operations of the noise spectrum analysis unit and the correction function determination unit of FIG. 4.

FIG. 5 is a view illustrating the operations of the noise spectrum analysis unit and the correction function determination unit of FIG. 4. The noise spectrum analysis unit 430 matches an $n^{th}$ frame subtracted spectrum $|Y(\omega,n)|-|N_e(\omega)|$ between an $n^{th}$ frame spectrum $|Y(\omega,n)|$ of the received training data and an estimated average spectrum $|N_e(\omega)|$ of noise with an $n^{th}$ frame spectrum $|S(\omega,n)|$ of the original training data, and then represents an error distribution in the estimation of the noise spectrum in relation with the portion having an amplitude value less than "0" in the subtracted spectrum $|Y(\omega,n)|-|N_e(\omega)|$, in a grey level. The portion having an amplitude value less than "0" in the subtracted spectrum $|Y(\omega,n)|-|N_e(\omega)|$ is divided into, for example, three areas A1, A2, and A3 according to the value of amplitude, and different correction functions for the respective areas are modeled. The portion having an amplitude value less than "0" in the subtracted spectrum $|Y(\omega,n)|-|N_e(\omega)|$ is divided into a first area A1, where the amplitude value is between 0 and −r, a second area A2, where the amplitude value is between −r and −2r, and a third area A3, where the amplitude value is less than −2r. The value of r to classify the first through third areas is determined such that the amplitude value belongs to a section [−2r, 0] that takes most of a first error function J, generally, 95% through 99%, and the amplitude value belongs to a section [−∞, −2r] that takes part of the first error function J, generally, 1% through 5%. The first error function J indicates an error distribution between the $n^{th}$ frame subtracted spectrum $|Y(\omega,n)|-|N_e(\omega)|$ (hereinafter, referred to as the "x")

and the nth frame spectrum |S(ω,n)| (hereinafter, referred to as the "y") of the original training data, which is expressed as Equation 1.

$$J=E\lfloor(x-y)^2\rfloor \qquad \text{[Equation 1]}$$

When the value of r for classifying the first through third areas A1, A2, and A3 is determined, the correction function g(x) for each area is determined. A decreasing function, generally, a one-dimensional function, is determined for the first area A1, an increasing function, generally, a one-dimensional function, is determined for the second area A2, and a function that g(x)=0 is determined for the third area A3. That is, the correction function g(x) of the first area A1 is −βx(g(x)=−βx) and the correction function g(x) of the second area A2 is β(x+2r)(g(x)=β(x+2r)). The slope β of each correction function is expressed by applying the first error function J to each correction function and is β-partially differentiated and determined to be a value that makes a differential coefficient equal to "0", which is shown in Equation 2.

Equation 2

$$J = E|(g(x)-y)^2| = \sum_{x<-2r} 0 + \sum_{-2r<x<-r} (\beta(x+2r)-y)^2 + \sum_{-r<x<0} (-\beta x - y)^2$$

$$\frac{\sigma}{\sigma\beta}J = \sum_{-2r<x<-r} 2(\beta(x+2r)-y)(x+2r) + \sum_{-r<x<0} 2x(\beta x + y) = 0$$

$$\therefore\ \beta \cong \frac{\sum_{-2r<x<-r} y(x+2r) - \sum_{-r<x<0} yx}{\sum_{-2r<x<-r} (x+2r)^2 + \sum_{-r<x<0} x^2}$$

In Equation 2, the slope β is greater than 0 and less than 1.

Figure 6:
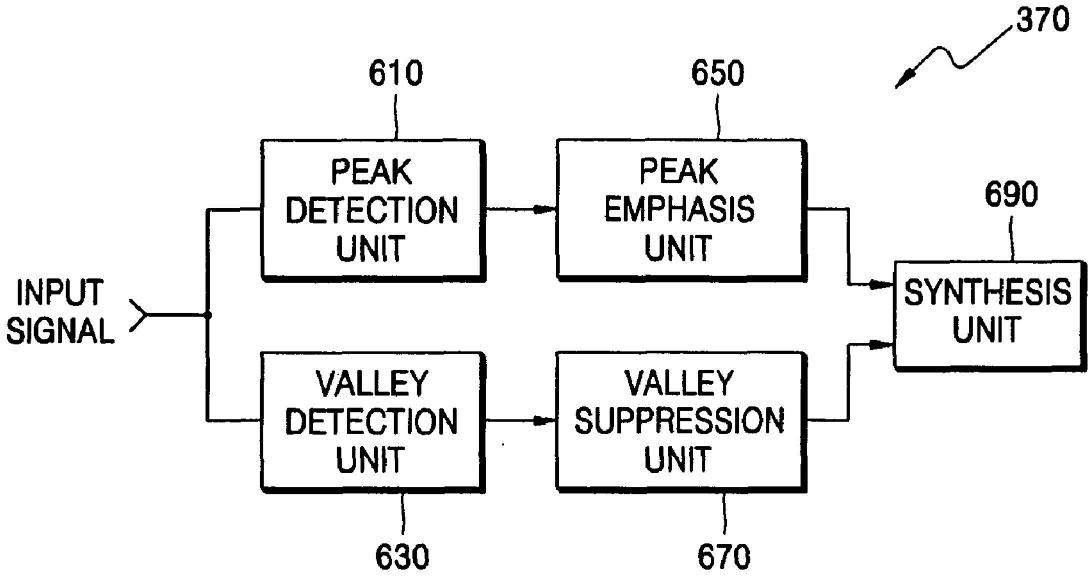
FIG. 6 is a block diagram illustrating a detailed configuration of the spectrum enhancement unit of FIG. 3.

FIG. 6 is a block diagram illustrating a detailed configuration of the spectrum enhancement unit of FIG. 3. The spectrum enhancement unit 370 includes a peak detection unit 610, a valley detection unit 630, a peak emphasis unit 650, a valley suppression unit 670, and a synthesis unit 690. The spectrum enhancement unit 370 may be connected to the output of the spectrum correction unit 350 or to the output of the spectrum subtraction unit 310. A case in which the spectrum enhancement unit 370 is connected to the output of the spectrum correction unit 350 is described herein.

Referring to FIG. 6, the peak detection unit 610 detects peaks with respect to the spectrum corrected by the spectrum correction unit 350. The peaks are detected by comparing the amplitude values x(k−1) and x(k+1) of two frequency components close to the amplitude value x(k) of a current frequency component sampled from the corrected spectrum provided from the spectrum correction unit 350. When the following Equation 4 is satisfied, the position of the current frequency component is detected as a peak.

Equation 4

$$\frac{x(k-1)+x(k+1)}{2} < x(k)$$

That is, when the amplitude value of the current frequency component is greater than the average amplitude value of the adjacent frequency components, the current frequency component is determined as a peak.

The valley detection unit 630 detects valleys with respect to the spectrum corrected by the spectrum correction unit 350. Likewise, the valleys are detected by comparing the amplitude values x(k−1) and x(k+1) of two frequency components proximate to the amplitude value x(k) of a current frequency component sampled from the corrected spectrum provided from the spectrum correction unit 350. When the following Equation 5 is satisfied, the position of the current frequency component is detected as a valley.

Equation 5

$$\frac{x(k-1)+x(k+1)}{2} > x(k)$$

That is, when the amplitude value of the present frequency component is less than the average amplitude value of the adjacent frequency components, the current frequency component is determined as a valley.

The peak emphasis unit 650 estimates an emphasis parameter from a second error function K between the spectrum corrected by the spectrum correction unit 350 and the original spectrum of the speech signal and emphasizes/enlarges a peak by applying an estimated emphasis parameter to each peak detected by the peak detection unit 610. When the second error function K is indicated as a sum of errors of the peaks and valleys using an emphasis parameter η and suppression parameter nl as shown in the following Equation 6, the emphasis parameter η is estimated as in Equation 7.

Equation 6

$$K = \sum_{x\in peak} (\mu x - y)^2 + \sum_{x\in valley} (\eta x - y)^2$$

$$\frac{\sigma}{\sigma\mu}K = \sum_{x\in peak} 2(\mu x - y)x = 0$$

Equation 7

$$\mu \cong \frac{\sum_{x\in peak} yx}{\sum_{x\in peak} x^2}$$

The emphasis parameter p is generally greater than 1.

That is, the amplitude value of each peak is multiplied by the emphasis parameter μ obtained from Equation 7 to enhance the spectrum.

The valley suppression unit 670 estimates a suppression parameter from the second error function K between the spectrum corrected by the spectrum correction unit 350 and the original spectrum of the speech signal and suppresses a valley by applying an estimated suppression parameter to each valley detected by the valley detection unit 630. When the second error function K is indicated as a sum of errors of the peaks and valleys using the emphasis parameter μ and suppression parameter η as shown in the above Equation 6, the suppression parameter η is estimated as in Equation 8.

Equation 8

$$\frac{\sigma}{\sigma\eta}K = \sum_{x\in valley} 2(\eta x - y)x = 0$$

$$\eta \cong \frac{\sum_{x\in valley} yx}{\sum_{x\in valley} x^2}$$

The suppression parameter η is generally greater than 0 and less than 1.

In the above Equations 6 through 8, "x" denotes the spectrum corrected by the spectrum correction unit 350 and "y" denotes the original spectrum of a speech signal. That is, the amplitude value of each valley is multiplied by the suppression parameter η obtained from Equation 8 to enhance the spectrum.

The synthesis unit 690 synthesizes the peaks emphasized/enlarged by the peak emphasis unit 650 and the valleys suppressed by the valley suppression unit 670 and outputs a finally enhanced speech spectrum.

Figure 7:
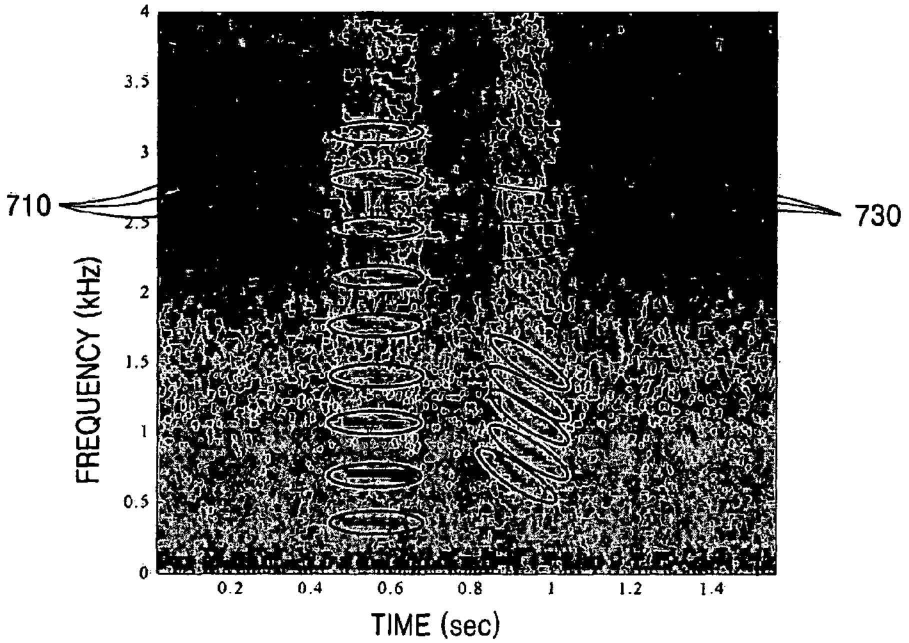
FIG. 7 is a view illustrating the operations of the peak emphasis unit and the valley suppression unit of FIG. 6.

FIG. 7 is a view illustrating the operations of the peak emphasis unit 650 and the valley suppression unit 670 of FIG. 6. In the amplitude spectrum viewed from a time axis, a plurality of peaks 710 are emphasized/enlarged, providing a clear display of the peaks, and a plurality of valleys 730 are suppressed and are not displayed well.

Figure 8:
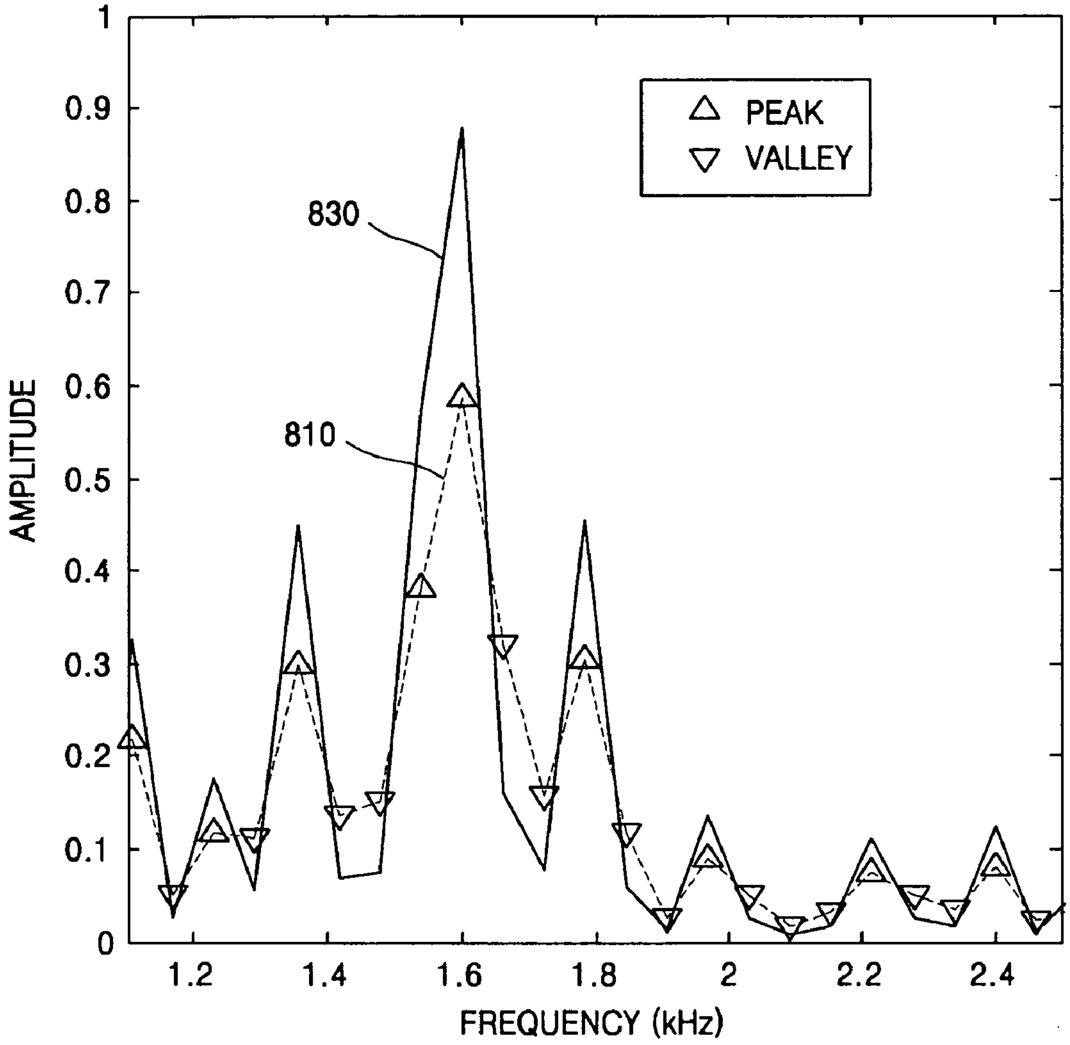
FIG. 8 is a graph showing a comparison between the input spectrum and the output spectrum of the spectrum enhancement unit of FIG. 3.

FIG. 8 is a graph showing a comparison between the input spectrum and the output spectrum of the spectrum enhancement unit 370 of FIG. 3. In FIG. 8, reference numerals 810 and 830 denote the input spectrum and the output spectrum, respectively. In the output spectrum 830, it is clear that the peaks are emphasized/enlarged and the valleys are suppressed.

Figure 9A:
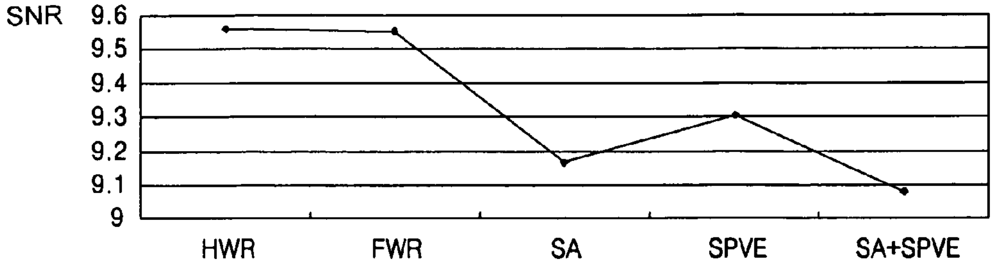
FIGS. 9A and 9B are graphs showing a comparison of performances between the conventional speech enhancement methods and the speech enhancement methods according to the present invention.
Figure 9B:
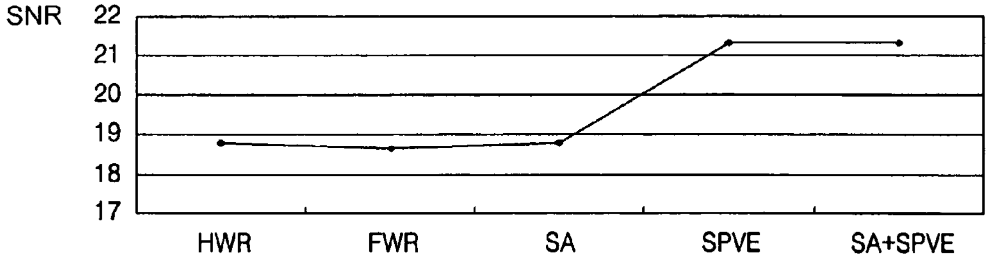

FIGS. 9A and 9B are graphs showing a comparison of performances between the conventional speech enhancement methods and the speech enhancement methods according to the present invention. In FIGS. 9A and 9B, the performances of the speech enhancement method according to the first embodiment of the present invention (hereinafter, referred to as the "SA") in which spectrum correction is performed by the spectrum correction unit 350 with respect to an input speech spectrum, the speech enhancement method according to the second embodiment of the present invention (hereinafter, referred to as the "SPVE") in which spectrum enhancement is performed by the spectrum enhancement unit 370 with respect to an input speech spectrum, the speech enhancement method according to the third embodiment of the present invention (hereinafter, referred to as the "SA+SPVE") in which the spectrum correction and spectrum enhancement are performed by the spectrum correction unit 350 and the spectrum enhancement unit 370, respectively, with respect to an input speech spectrum, the conventional HWR method, and the conventional FWR method, are compared. For the comparison of the performances, a hundred isolated words such as the name of a person, the name of a place, or the name of business are spoken by eight men and eight women, and a total of 1,600 utterance data are obtained and used. Endpoint information that is manually marked is given. Car noise recorded in a running car is used as an example of added noise. The signal-to-noise ratio (hereinafter, referred to as the "SNR") of a noise signal recorded from clean speech is set to be 0 dB and the distance of mel-frequency cepstral coefficients (hereinafter, referred to as the "D_MFCC") and the SNR are measured. The D_MFCC refers to the distance between MFCCs of the original speech and the speech where noise is removed. The SNR refers to the ratio of power between the speech signal and the noise signal.

FIG. 9A is a graph for a comparison of the D_MFCC, which shows that the SA, SPVE, and SA+SPVE are remarkably improved compared to the HWR and FWR. FIG. 9B is a graph for a comparison of the SNR, which shows that the SA maintains a same level as the HWR and FWR while the SPVE and SA+SPVE are remarkably improved compared to the HWR and FWR.

The invention can also be embodied as computer readable codes on a computer readable recording medium. The computer readable recording medium is any data storage medium or device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily constructed by programmers skilled in the art to which the present invention pertains.

As described above, according to the speech enhancement apparatus and method according to the present invention, the portion where a negative number is generated in the subtracted spectrum is corrected using a correction function which optimizes the portion wherein a negative number is generated for a given environment and minimizes distortion in speech. Thus, the noise removal function is improved, and simultaneously, the quality and natural characteristics of speech are improved.

Also, according to the speech enhancement apparatus and method according to the present invention, since a frequency component having a relatively greater amplitude value is emphasized/enlarged and a frequency component having a relatively smaller amplitude value is suppressed in the subtracted spectrum, speech is enhanced without estimating a format.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A speech enhancement apparatus comprising:

a computer comprising:

a spectrum subtraction unit to generate a subtracted spectrum by subtracting an estimated noise spectrum from a received speech spectrum;

a correction function modeling unit to generate a correction function to minimize error in the estimated noise spectrum of the subtracted spectrum using variation of a noise spectrum included in training data; and a spectrum correction unit to generate a corrected spectrum by correcting the subtracted spectrum using the correction function, wherein the correction function modeling unit identifies a portion of the subtracted spectrum having an amplitude value less than 0, divides the portion into a plurality of areas having different amplitude ranges of the amplitude value in consideration of an error distribution between the received speech spectrum and subtracted spectrum for each of the amplitude divided areas and models the correction function for each area differently using a flat function model, an increasing function model and a decreasing function model.

2. The speech enhancement apparatus as claimed in claim 1, further comprising a spectrum enhancement unit enhancing the corrected spectrum by enlarging a peak and suppressing a valley of the corrected spectrum.

3. The speech enhancement apparatus as claimed in claim 1, wherein the correction function modeling unit comprises:

a training data input unit receiving a speech spectrum of the training data;

the noise spectrum analysis unit analyzing a noise spectrum included in the received speech spectrum using:

an error distribution of a subtracted spectrum between the received speech spectrum of the training data and the estimated noise spectrum, and an original speech spectrum of the training data; and a correction function determination unit receiving an output of the noise spectrum analysis unit and generating a correction function for each area.

4. The speech enhancement apparatus as claimed in claim 3, wherein the noise spectrum analysis unit:

divides the portion having an amplitude value less than 0 in the subtracted spectrum into first, second and third areas;

determines a first boundary value that divides the first and second areas such that the first and second areas have a first distribution degree in the error distribution and the third area has a second distribution degree in the error distribution; and sets a second boundary value that divides the second and third areas equal to twice the first boundary value.

5. The speech enhancement apparatus as claimed in claim 4, wherein the first distribution degree of the first and second areas is 95% through 99%, and the second distribution degree of the third area is 1% through 5%.

6. The speech enhancement apparatus as claimed in claim 4, wherein the correction function of the first area is a decreasing function, the correction function of the second area is an increasing function, and the correction function of the third area is 0.

7. The speech enhancement apparatus as claimed in claim 2, wherein the spectrum enhancement unit comprises:

a peak detection unit detecting at least one peak in the corrected spectrum;

a valley detection unit detecting at least one valley in the corrected spectrum;

a peak emphasis unit enlarging detected peaks using an emphasis parameter;

a valley suppression unit suppressing detected valleys using a suppression parameter; and a synthesis unit synthesizing the enlarged peaks and the suppressed valleys.

8. The speech enhancement apparatus as claimed in claim 7, wherein, when an amplitude value of a current frequency component is greater than an average amplitude value of frequency components proximate to the corrected spectrum, the peak detection unit determines that the current frequency component is a peak.

9. The speech enhancement apparatus as claimed in claim 7, wherein, when an amplitude value of a current frequency component is less than an average amplitude value of frequency components proximate to the corrected spectrum, the valley detection unit determines that the current frequency component is a valley.

10. A speech enhancement apparatus comprising:

a computer comprising:

a spectrum subtraction unit to subtract an estimated noise spectrum from a received speech spectrum, and to generate a corrected subtracted spectrum, in which a negative number portion is corrected according to identifying a portion of a subtracted spectrum including training data having an amplitude value less than 0, dividing the portion into a plurality of areas having different amplitude ranges of according to the amplitude value in consideration of an error distribution between the received speech spectrum and subtracted spectrum for each of the amplitude divided areas and modeling a correction function for each area differently using a flat function model, an increasing function model and a decreasing function model; and a spectrum enhancement unit to enhance the corrected subtracted spectrum by enlarging a peak and suppressing a valley in the corrected subtracted spectrum.

11. The speech enhancement apparatus as claimed in claim 10, wherein the spectrum subtraction unit corrects the negative number portion by substituting an absolute value in place of the negative number portion.

12. The speech enhancement apparatus as claimed in claim 10, wherein the spectrum subtraction unit corrects the negative number portion by substituting 0 in place of the negative number portion.

13. The speech enhancement apparatus as claimed in claim 10, wherein the spectrum enhancement unit comprises:

a peak detection unit detecting at least one peak in the corrected subtracted spectrum;

a valley detection unit detecting at least one valley in the corrected subtracted spectrum;

a peak emphasis unit enlarging detected peaks using an emphasis parameter;

a valley suppression unit suppressing detected valleys using a suppression parameter; and a synthesis unit synthesizing the enlarged peaks and the suppressed valleys.

14. The speech enhancement apparatus as claimed in claim 13, wherein, when an amplitude value of a current frequency component is greater than an average amplitude value of frequency components proximate to the corrected subtracted spectrum, the peak detection unit determines that the current frequency component is a peak.

15. The speech enhancement apparatus as claimed in claim 13, wherein, when an amplitude value of a current frequency component is less than an average amplitude value of frequency components proximate to the corrected subtracted spectrum, the valley detection unit determines that the current frequency component is a valley.

16. The speech enhancement apparatus as claimed in claim 7, wherein the emphasis parameter is greater than 1.

17. The speech enhancement apparatus as claimed in claim 13, wherein the emphasis parameter is greater than 1.

18. The speech enhancement apparatus as claimed in claim 7, wherein the suppression parameter is greater than 0 and less than 1.

19. The speech enhancement apparatus as claimed in claim 13, wherein the suppression parameter is greater than 0 and less than 1.

20. A speech enhancement method comprising:

generating a subtracted spectrum by subtracting an estimated noise spectrum from a received speech spectrum;

generating a correction function to minimize error in the estimated noise spectrum of the subtracted spectrum using variation of a noise spectrum included in training data, comprising identifying a portion of the subtracted spectrum having an amplitude value less than 0, dividing the portion into a plurality of areas having different amplitude ranges of according to the amplitude value in consideration of an error distribution between the received speech spectrum and subtracted spectrum for each of the amplitude divided areas and modeling the correction function for each area differently using a flat function model, an increasing function model and a decreasing function model; and generating a corrected spectrum by correcting the subtracted spectrum using the correction function.

21. The speech enhancement method as claimed in claim 20, further comprising enhancing the corrected spectrum by emphasizing a peak and suppressing a valley in the corrected spectrum.

22. The speech enhancement method as claimed in claim 20, wherein the generating of the correction function further comprises:

analyzing a noise spectrum included in the received speech spectrum using an error distribution of a subtracted spectrum between the received speech spectrum of a training data and the estimated noise spectrum and an original speech spectrum of the training data; and receiving a result of the noise spectrum analysis and generating the correction function of each area.

23. The speech enhancement method as claimed in claim 22, wherein, in the analyzing of the noise spectrum, the portion having an amplitude value less than 0 in the subtracted spectrum is divided into first, second and third areas, a first boundary value that divides the first and second areas is determined such that the first and second areas have a first distribution degree in the error distribution, the third area has a second distribution degree in the error distribution, and a second boundary value that divides the second and third areas is set equal to twice the first boundary value.

24. The speech enhancement method as claimed in claim 23, wherein the first distribution degree of the first and second areas is 95% through 99%, and the second distribution degree of the third area is 1% through 5%.

25. The speech enhancement method as claimed in claim 23, wherein each of the correction functions $g_1(x)$, $g_2(x)$, and $g_3(x)$ of the first, second and third areas is determined by the following equations:

$$g_1(x)=-\beta x,$$

$$g_2(x)=\beta(x+2r), \text{ and}$$

$$g_3(x)=0,$$

wherein $$\beta \cong \frac{\sum_{-2r<x<-r} y(x+2r) - \sum_{-r<x<0} yx}{\sum_{-2r<x<-r} (x+2r)^2 + \sum_{-r<x<0} x^2};$$

$\beta$ is a slope of each correction function, x denotes a frequency component corresponding to a peak in the corrected spectrum or subtracted spectrum, y denotes a frequency component included in the original speech spectrum, and r is the first boundary value.

26. The speech enhancement method as claimed in claim 21, wherein the enhancing of the corrected spectrum comprises:

detecting at least one peak and at least one valley in the corrected spectrum;

enlarging detected peaks using an emphasis parameter and suppressing detected valleys using a suppression parameter; and synthesizing the enlarged peaks and the suppressed valleys.

27. The speech enhancement method as claimed in claim 26, wherein a current frequency component is determined as a peak when an amplitude value x(k) of the current frequency component sampled from the corrected spectrum and amplitude values x(k−1) and x(k+1) of two frequency components proximate to the amplitude value x(k) of the current frequency component satisfy the following inequity:

$$\frac{x(k-1)+x(k+1)}{2} < x(k),$$

wherein k represents a current frequency component sampled from the corrected spectrum or subtracted spectrum, x denotes a frequency component corresponding to a peak in the corrected spectrum or subtracted spectrum and y denotes a frequency component included in the original speech spectrum.

28. The speech enhancement method as claimed in claim 26, wherein a current frequency component is determined to be a valley when an amplitude value x(k) of the current frequency component sampled from the corrected spectrum and amplitude values x(k−1) and x(k+1) of two frequency components proximate to the amplitude value x(k) of the current frequency component satisfy the following inequity:

$$\frac{x(k-1)+x(k+1)}{2} > x(k),$$

wherein k represents a current frequency component sampled from the corrected spectrum or subtracted spectrum , x denotes a frequency component corresponding to a peak in the corrected spectrum or subtracted spectrum and y denotes a frequency component included in the original speech spectrum.

29. A speech enhancement method comprising:

subtracting an estimated noise spectrum from a received speech spectrum and generating a subtracted spectrum wherein a negative number portion is corrected to generate a corrected spectrum, the correcting comprising identifying a portion of a subtracted spectrum including training data and having an amplitude value less than 0, dividing the portion into a plurality of areas according to the amplitude value in consideration of an error distribution between the received speech spectrum and subtracted spectrum for each of the amplitude divided areas and modeling a correction function for each area differently using a flat function model, an increasing function model and a decreasing function model; and enhancing the corrected spectrum by enlarging a peak and suppressing a valley in the corrected spectrum.

30. The speech enhancement method as claimed in claim 29, wherein, in the subtracting of the spectrum, the corrected spectrum is generated by substituting an absolute value in place of the negative number portion.

31. The speech enhancement method as claimed in claim 29, wherein, in the subtracting of the spectrum, the subtracted spectrum is corrected by substituting 0 in place of the negative number portion.

32. The speech enhancement method as claimed in claim 29, wherein the enhancing of a corrected spectrum comprises:

detecting at least one peak and at least one valley in the corrected spectrum;

enlarging detected peaks using an emphasis parameter and suppressing detected valleys using a suppression parameter; and synthesizing the enlarged peaks and the suppressed valleys.

33. The speech enhancement method as claimed in claim 32, wherein a current frequency component is determined to be a peak when an amplitude value x(k) of the current frequency component sampled from the subtracted spectrum and amplitude values x(k−1) and x(k+1) of two frequency components proximate to the amplitude value x(k) of the current frequency component satisfy the following inequity:

$$\frac{x(k-1)+x(k+1)}{2} < x(k),$$

wherein k represents a current frequency component sampled from the corrected spectrum or subtracted spectrum, x denotes a frequency component corresponding to a peak in the corrected spectrum or subtracted spectrum and y denotes a frequency component included in the original speech spectrum.

34. The speech enhancement method as claimed in claim 32, wherein a current frequency component is determined to be a valley when an amplitude value x(k) of the current frequency component sampled from the subtracted spectrum and amplitude values x(k−1) and x(k+1) of two frequency components proximate to the amplitude value x(k) of the current frequency component satisfy the following inequity:

$$\frac{x(k-1)+x(k+1)}{2} > x(k),$$

wherein k represents a current frequency component sampled from the corrected spectrum or subtracted spectrum, x denotes a frequency component corresponding to a peak in the corrected spectrum or subtracted spectrum and y denotes a frequency component included in the original speech spectrum.

35. The speech enhancement method as claimed in claim 26, wherein the emphasis parameter μis determined by the following equation:

$$\mu \cong \frac{\sum_{x\in peak} yx}{\sum_{x\in peak} x^2},$$

wherein x denotes a frequency component corresponding to a peak in the corrected spectrum or subtracted spectrum and y denotes a frequency component included in the original speech spectrum.

36. The speech enhancement method as claimed in claim 26, wherein the emphasis parameter η is determined by the following equation:

$$\eta \cong \frac{\sum_{x\in valley} yx}{\sum_{x\in valley} x^2},$$

wherein x denotes a frequency component corresponding to a valley in the corrected spectrum or subtracted spectrum and y denotes a frequency component included in the original speech spectrum.

37. A non-transitory computer-readable recording medium recording a program to cause a computer to perform a speech enhancement method, the method comprising:

generating a subtracted spectrum by subtracting an estimated noise spectrum from a received speech spectrum;

generating a correction function to minimize error in the estimated noise spectrum of the subtracted spectrum using transition of a noise spectrum included in training data comprising identifying a portion of a subtracted spectrum including training data and having an amplitude value less than 0, dividing the portion into a plurality of areas having different amplitude ranges of according to the amplitude value in consideration of an error distribution between the received speech spectrum and subtracted spectrum for each of the amplitude divided areas and modeling the correction function for each area differently using a flat function model, an increasing function model and a decreasing function model; and generating a corrected spectrum by correcting the subtracted spectrum using the correction function.

38. The computer-readable recording medium as claimed in claim 37, wherein the method further comprises enhancing the corrected spectrum by enlarging a peak and suppressing a valley in the corrected spectrum.

39. A non-transitory computer-readable recording medium recording a program to cause a computer to perform a speech enhancement method, the method comprising:

subtracting an estimated noise spectrum from a received speech spectrum and generating a subtracted spectrum wherein a negative number portion is corrected, to provide a corrected subtracted spectrum;

identifying a portion of the subtracted spectrum having an amplitude value less than 0, dividing the portion into a plurality of areas according to the amplitude value in consideration of an error distribution between the received speech spectrum and subtracted spectrum and modeling a correction function for each area differently using a flat function model, an increasing function model and a decreasing function model; and enhancing the corrected subtracted spectrum by enlarging a peak and suppressing a valley in the corrected subtracted spectrum.

* * * * *

UNITED STATES PATENT AND TRADEMARK OFFICE

CERTIFICATE OF CORRECTION

PATENT NO. : 8,214,205 B2
APPLICATION NO. : 11/346273
DATED : July 3, 2012
INVENTOR(S) : Giljin Jang et al.

It is certified that error appears in the above-identified patent and that said Letters Patent is hereby corrected as shown below:

Column 11, Line 48, In Claim 25, delete "βis" and insert -- β is --, therefor.
Column 12, Line 28-29, In Claim 28, delete "spectrum ," and insert -- spectrum, --, therefor.
Column 13, Line 42 (Approx.), In Claim 35, delete "μis" and insert -- μ is --, therefor.

Signed and Sealed this
Twentieth Day of November, 2012

David J. Kappos
*Director of the United States Patent and Trademark Office*